June 14, 1932.  H. F. SCHIPPEL  1,863,031
CUSHION TIRE
Filed March 27, 1931   2 Sheets-Sheet 2
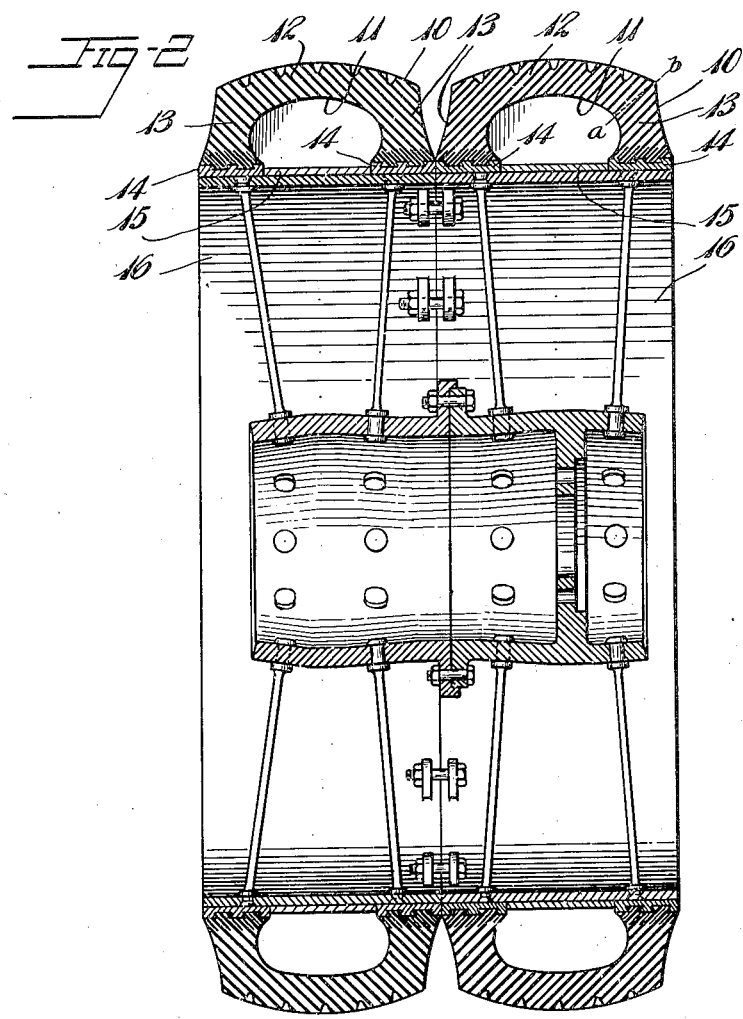
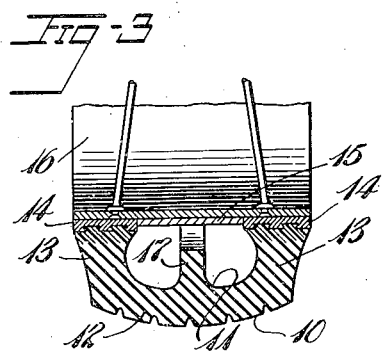
Inventor
Henry F. Schippel
By Eakin & Avery
Attys.

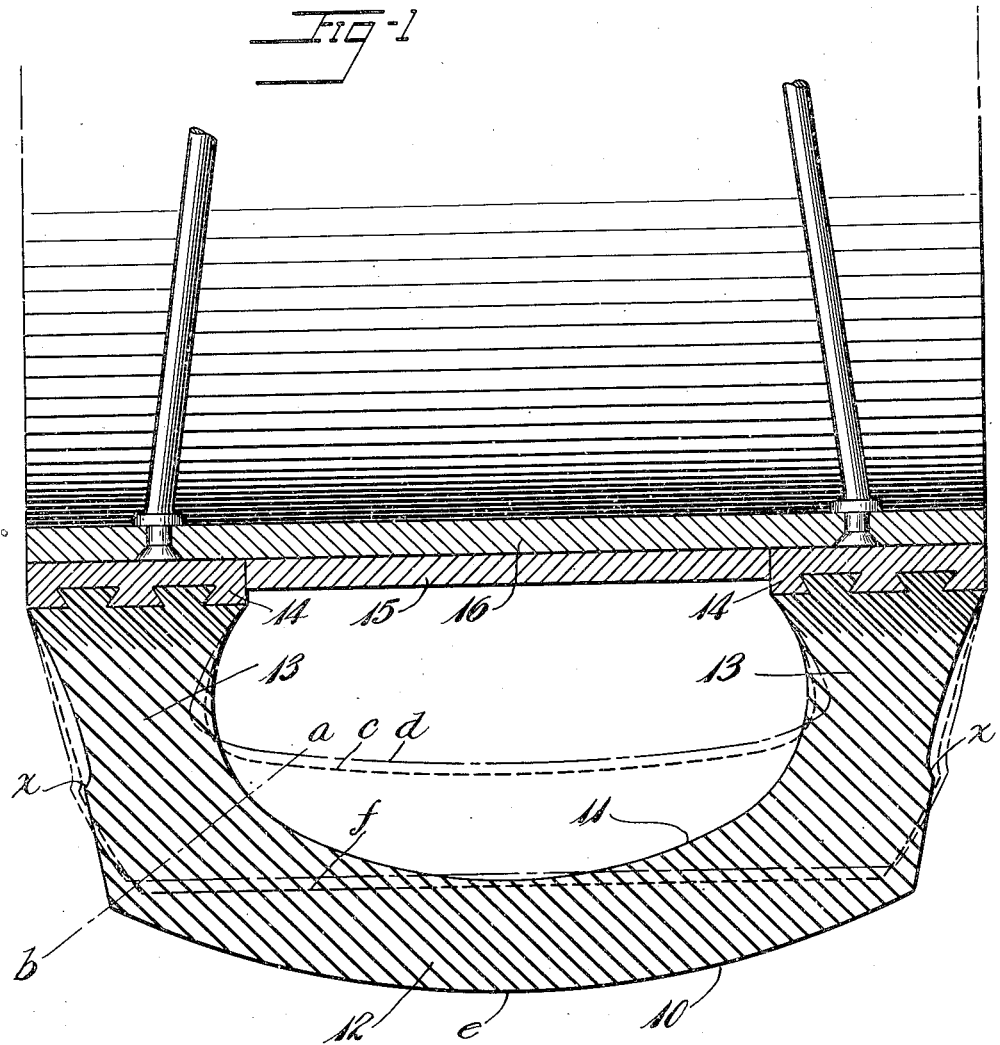

Patented June 14, 1932

1,863,031

UNITED STATES PATENT OFFICE

HENRY F. SCHIPPEL, OF AKRON, OHIO, ASSIGNOR TO THE B. F. GOODRICH COMPANY, OF NEW YORK, N. Y., A CORPORATION OF NEW YORK

CUSHION TIRE

Application filed March 27, 1931. Serial No. 525,856.

This invention relates to cushion tires, and especially cushion tires designed for use on vehicles which must travel over loose sand or cultivated soil, as in the case of tractors used in pulling agricultural implements, although it is not wholly limited to such use.

Objects of my invention are to produce a tire so constructed as to provide a snow-shoe effect in lose sand or other soft soil; to provide a tire having a tread adapted to be deflected adequately for extensive ground contact by moderate loads and thus to provide a high coefficient of traction; to provide a tire adapted to yield adequately for easy riding but without such rebound as to excessively reduce the traction and cause slippage, which is of especial importance in the case of agricultural instruments such as cotton pickers and harvesters requiring the crop-manipulating mechanisms to be driven in time with the forward movement of the machine; to provide a non-pneumatic tire adapted to be used on tractors in orchards, sugar plantations, vineyards and the like without damage to roots lying near the surface of the soil; to provide a tire adapted to be used on pavements without injury to the latter; to provide a tire highly yielding under light loads but adapted strongly to resist further deformation by heavy loads; to provide a tire suitable for the purposes described but not requiring inflation, which is of especial importance in road graders, for example, used far from an air supply; and to provide inexpensively a tire having these advantages.

Of the accompanying drawings:

Fig. 1 is a cross-section with diagrammatic lines showing the variation of the cross-sectional shape of the tire under different loads.

Fig. 2 is a vertical axial section of a wheel and two tires thereon embodying the invention as applied to a dual-tire tractor wheel, the tires being of a somewhat different contour from that of the tire of Fig. 1.

Fig. 3 is a cross-section of a modification.

Referring to the drawings, the tire in its preferred form comprises an all-rubber cushion tire body 10 formed with a longitudinal cavity 11 of substantially elliptical cross-sectional form, with the major axis of the ellipse parallel with the axis of rotation of the tire. The cavity is defined by a tread portion 12 and side walls 13, 13 integral therewith, the outer face of the tread portion 12 is transversely convex with approximately the same curvature as that of the middle portion of its inner face, and the outer face of the side wall is so nearly vertical that in the region of the junction of the tread portion and the side wall, at the shoulder of the tire, the tire body has greater thickness in a direction normal to its cavity-defining inner wall, from $a$ to $b$, than it has at the middle of the tread or at the middle of the side wall, so that the hinge action at the side of the tread in the flattening of the latter will not be localized but, because of the relative thickness of the tire wall at the shoulder, will be distributed, which effect is enhanced by the inwardly bowed contour at $x$, Fig. 1. Thus destructive creasing of the inner face of the tire is avoided, as indicated by the dotted line $c$ in Fig. 1, representing actual measurements taken with the tire under approximately normal load, and the dot-and-dash line $d$ in Fig. 1, representing actual measurements taken with the tire under nearly 100% over-load.

The outer faces of the side walls of the tire in the preferred embodiment being approximately vertical, as shown, each side wall provides an approximately vertical abutment of such thickness and strength as to take directly a large part of the load in excess of that required to flatten the tread, although the middle portion of the side wall has been flexed outward slightly in the distribution of the hinging action in the flattening of the tread, so that under heavy loads the tire strongly resists deformation beyond the flattening of the tread and thus limits the outward bowing of the inner face of the side wall and prevents destructive creasing thereof, as is indicated in the close proximity of the lines $c$ and $d$ in Fig. 1, although light and normal loads may be carried with a high cushioning effect, as is indicated by the long distance from the position of the tread face in the unstrained condition of the tire, the line $e$ of Fig. 1, to the dotted line $f$ of Fig. 1.

The outward bowing of the side walls is of such small magnitude that two of the tires may be mounted close together as dual tires as shown in Fig. 2 without interference under heavy load although the treads of the tires have high radial deflection under normal and light loads and such energy absorption, in contrast to pneumatic tires, that they do not excessively rebound and lose traction under heavy pull.

In the modification shown in Fig. 3, a medial internal rib 17 is formed on the inner side of the tread and is of such radial depth as to come to bear against the tire-base structure at about the same condition of loading as that at which the tread is completely flattened and the side walls begin to support a part of the load directly, this construction providing still further strength of the tire against heavy over-loads although permitting the tire to function with easy riding qualities under light loads.

The tire may be formed and vulcanized by the usual methods and may comprise the usual base rings 14, 14 and a spacer ring 15 mounted between and welded to them, or other suitable spacer means, and the tire may be mounted upon the wheel 16 in the usual pressed-on relation thereto.

The tire provides the advantages set out in the above statement of objects and may be variously modified without sacrifice of all of them.

I claim:

1. A cushion tire comprising a substantially all-rubber tire body formed with a longitudinal cavity of substantially elliptical cross-sectional form having the major axis of the ellipse parallel with the axis of rotation of the tire and substantially spaced from the base of the tire.

2. A cushion tire comprising a substantially all-rubber tire body having a tread wall and side walls forming lateral shoulders and formed by a longitudinal cavity of substantially elliptical cross-sectional form having the major axis of the ellipse parallel with the axis of rotation of the tire and substantially spaced from the base of the tire, the thickness of the wall of the tire body in directions normal to the cavity-defining inner surface thereof being greater at the shoulder of the tire than at the major axis of the ellipse.

3. A cushion tire comprising a substantially all-rubber tire body having a longitudinal cavity of substantially elliptical cross-sectional form with the major axis of the ellipse parallel with the axis of rotation of the tire and substantially spaced from the base of the tire, the tread surface of the tire without load being transversely convex with a curvature approximately the same as that of the inner surface of the middle portion of the tread portion of the cavity.

4. A cushion tire comprising a substantially all-rubber tire body having a tread wall and side walls formed by a longitudinal cavity of substantially elliptical cross-sectional form with the major axis of the ellipse parallel with the axis of rotation of the tire and substantially spaced from the base of the tire, the tread surface of the tire without load being transversely convex with a curvature approximately the same as that of the inner surface of the middle portion of the tread and the outer faces of the side walls of the tire being approximately vertical.

5. A cushion tire comprising a tire-body having in unstrained condition side walls and a tread portion defining an internal, longitudinally disposed cavity of a width at least as great as its depth, the tread portion being transversely convex on its outer face, and the side walls being of substantial depth and so nearly vertical and of such greater thickness than the tread wall and the tread surface having such a transverse curvature that the side walls directly support such large portion of the load as to prevent destructive creasing of the inner face of the tire under heavy overloads, said side walls having bases of increased thickness supported on and vulcanized to a metal rim structure.

6. A cushion tire comprising a tire-body having in unstrained condition side walls and a tread portion defining an internal, longitudinally disposed cavity of a width at least as great as its depth, the tread portion being transversely convex on its outer face, and the side walls being of substantial depth and so shaped that both their inner and their outer faces move outwardly under loads and are capable of radial compression and thereby directly support the greater portion of the load and prevent destructive creasing of the inner face of the tire under heavy overloads, said side walls being supported on and vulcanized to a metal rim structure.

In witness whereof I have hereunto set my hand this 20th day of March, 1931.

HENRY F. SCHIPPEL.